US012576901B2

(12) United States Patent (10) Patent No.: US 12,576,901 B2
Kessler et al. (45) Date of Patent: Mar. 17, 2026

(54) SYSTEM AND METHOD FOR HAPTIC CALIBRATION

(71) Applicant: Tesla, Inc., Austin, TX (US)

(72) Inventors: Michael Kessler, Los Gatos, CA (US); Blane Frye, San Francisco, CA (US); Tyler Sawatzky, Calgary (CA)

(73) Assignee: Tesla, Inc., Austin, TX (US)

( * ) Notice: Subject to any disclaimer, the term of this patent is extended or adjusted under 35 U.S.C. 154(b) by 8 days.

(21) Appl. No.: 18/722,444

(22) PCT Filed: Dec. 16, 2022

(86) PCT No.: PCT/US2022/053217

§ 371 (c)(1),
(2) Date: Jun. 20, 2024

(87) PCT Pub. No.: WO2023/121977

PCT Pub. Date: Jun. 29, 2023

(65) Prior Publication Data

US 2025/0074496 A1     Mar. 6, 2025

Related U.S. Application Data

(60) Provisional application No. 63/292,398, filed on Dec. 21, 2021.

(51) Int. Cl.
B62D 1/04         (2006.01)
B60K 35/10        (2024.01)
(Continued)

(52) U.S. Cl.
CPC .............. B62D 1/046 (2013.01); B60K 35/22 (2024.01); B60K 35/25 (2024.01); B60K 35/60 (2024.01);
(Continued)

(58) Field of Classification Search
CPC ........ B62D 1/046; B60K 35/22; B60K 35/25; B60K 35/60; B60K 35/10; B60K 2360/782; G06F 3/016; G06F 3/0338
See application file for complete search history.

(56) References Cited

U.S. PATENT DOCUMENTS 8,987,620 B2 * 3/2015 Gohng ................. G06F 3/0338
                                                  200/61.54
11,610,459 B2 * 3/2023 Wang ................... B06B 1/0261
                        (Continued)

FOREIGN PATENT DOCUMENTS

CN      118786045      10/2024
JP      2025502696     1/2025
WO      2023121977     6/2023

OTHER PUBLICATIONS

"International Application Serial No. PCT/US2022/053217, International Search Report mailed May 31, 2023", 3 pgs.
(Continued)

*Primary Examiner* — Lindsay M Low
*Assistant Examiner* — Ruben Picon-Feliciano
(74) *Attorney, Agent, or Firm* — Schwegman Lundberg & Woessner, P.A.

(57)                 ABSTRACT

A switchpack for a vehicle is provided that includes a haptic motor configured to provide haptic feedback to a user in a first mode of operation and provide haptic feedback to at least one sensor in a second mode of operation. The switchpack includes at least one sensor adapted to generate electric signals in response to force applied on the at least one sensor by the user during the first mode of operation. The at least one sensor is further configured to sense the haptic feedback provided by the haptic motor during the second mode of operation.

20 Claims, 10 Drawing Sheets

(51) Int. Cl.

| | |
|---|---|
| *B60K 35/22* | (2024.01) |
| *B60K 35/25* | (2024.01) |
| *B60K 35/60* | (2024.01) |
| *G06F 3/01* | (2006.01) |

(52) U.S. Cl.
CPC .............. *G06F 3/016* (2013.01); *B60K 35/10* (2024.01); *B60K 2360/782* (2024.01)

(56) References Cited

U.S. PATENT DOCUMENTS

| | | | | |
|---|---|---|---|---|
| 11,634,029 B2 * | 4/2023 | Bachmeier | .............. | B60R 13/02 |
| | | | | 345/174 |
| 11,661,025 B2 * | 5/2023 | Kring | ................ | B60R 21/21658 |
| | | | | 345/156 |
| 11,745,756 B2 * | 9/2023 | Tucker | .................. | B60W 30/02 |
| | | | | 701/26 |
| 2010/0198458 A1 * | 8/2010 | Buttolo | .............. | G01C 21/3652 |
| | | | | 701/532 |

| | | | | |
|---|---|---|---|---|
| 2012/0253593 A1 * | 10/2012 | Tran | ...................... | B60W 50/16 |
| | | | | 701/36 |
| 2018/0194369 A1 * | 7/2018 | Lisseman | .............. | B60W 50/16 |
| 2018/0336329 A1 * | 11/2018 | Walford | ................... | B60Q 3/00 |
| 2020/0039558 A1 | 2/2020 | Aerts et al. | | |
| 2020/0039559 A1 | 2/2020 | Aerts et al. | | |
| 2020/0398884 A1 * | 12/2020 | Katsuyama | ........... | B62D 1/046 |
| 2021/0263590 A1 * | 8/2021 | Lee | ......................... | G06F 3/016 |

OTHER PUBLICATIONS

"International Application Serial No. PCT/US2022/053217, Written Opinion mailed May 31, 2023", 5 pgs.

"European Application Serial No. 22854218.9, Response to Communication Pursuant to Rules 161 and 162 EPC Filed Feb. 3, 2025", 28 pgs.

"International Application Serial No. PCT US2022 053217, International Preliminary Report on Patentability mailed Jul. 4, 2024", 7 pgs.

\* cited by examiner

SYSTEM AND METHOD FOR HAPTIC CALIBRATION

CROSS-REFERENCE TO RELATED APPLICATIONS

This application is a U.S. National Stage Filing under 35 U.S.C. § 371 from International Application No. PCT/US2022/053217, filed on Dec. 16, 2022, and published as WO2020/121977 on Jun. 29, 2023, which claims the benefit of U.S. Provisional Application No. 63/292,398, filed Dec. 21, 2021; the benefit of priority of each of which is hereby claimed herein, and which applications and publication are hereby incorporated herein by reference in their entireties.

TECHNICAL FIELD

The present disclosure relates to a system and method for improving haptic feedback. More particularly, the present disclosure relates to calibrating a steering wheel assembly for haptic feedback.

BACKGROUND

Steering wheel assemblies are associated with a number of automotive applications to allow a driver to maneuver a vehicle. Current steering wheel assemblies are primarily used to control a movement of the vehicle. However, there are many other functionalities that the driver may need to change or update while driving, for example selecting driver-assist functionality, activating turn signals, activating a horn, controlling the climate (for example increasing or decreasing the cabin temperature or increasing or decreasing the fan speed), making a telephone call, or another action. In such a situation, drivers typically have to remove at least one hand from the steering wheel assembly to manipulate functionalities on another interface. This may distract the driver from driving.

Some steering wheel assemblies include one or more pressure sensitive components disposed within a switch-pack. The pressure sensitive component generates electric signals in response to force applied on the switchpack. The pressure sensitive component may provide a haptic feedback via a haptic motor. In this way, the haptic motor is designed to provide tactile feedback to the user when the user interacts with the pressure sensitive component. However, the quality of the haptic feedback can vary between switchpacks due to manufacturing variations (e.g., component tolerances, assembly, materials, manufacturing variations) as well as over the life of the switchpack (e.g., wear and tear, climate, warping, etc.). Thus, there is a need to normalize the quality of the haptic feedback to ensure a superior user experience for the life of the vehicle.

SUMMARY

The present disclosure relates to a steering wheel assembly that includes a calibration system. The steering wheel assembly includes a steering rim. The steering wheel assembly also includes a switchpack connected to the steering rim. The steering wheel assembly further includes at least one pressure or proximity sensitive component (e.g., sensor) disposed within the switchpack.

In a first mode of operation, the at least one pressure or proximity sensitive component (e.g., sensor) generates electric signals in response to force applied or anticipation of force being applied on the switchpack. The at least one pressure or proximity sensitive component may include any one or more of at least one piezoelectric switch, a piezoelectric sensor, and a capacitive array. In certain embodiments, a controller is electrically connected to the at least one pressure or proximity sensitive component. The controller determines a user input or a gesture made by a user on the switchpack based on the electric signals received from the at least one pressure or proximity sensitive component.

In a second mode of operation, the at least one pressure or proximity sensitive component acts as a target sensor for a calibration process. During the calibration process, the target sensor senses haptic playback emitted by a haptic motor disposed in the steering wheel assembly. The target sensor provides data or information related to the sensed haptic playback to the calibration system. In certain embodiments, the controller calibrates the haptic motor. For example, in certain embodiments, the controller determines the resonance frequency of the steering wheel assembly which is then utilized during the first mode of operation.

An aspect is directed to switchpack for a vehicle. The switchpack comprises at least one sensor adapted to generate electric signals in response to force applied on the at least one sensor by the user during a first mode of operation and a haptic motor configured to provide haptic feedback to the user in response to the force applied on the at least sensor during the first mode of operation and provide haptic feedback to the at least one sensor in a second mode of operation. Wherein the at least one sensor is further configured to sense the haptic feedback provided by the haptic motor during the second mode of operation.

A variation of the aspect above is, wherein the first mode of operation is during use of the vehicle, and wherein the second mode of operation is during a calibration process for the haptic motor.

A variation of the aspect above further comprises a controller configured to identify a resonance frequency at least in part based on the haptic feedback sensed by the at least one sensor during the second mode of operation.

A variation of the aspect above is, wherein the controller is further configured to change the haptic feedback that will be provided by the haptic motor during the first mode of operation based at least in part on the resonance frequency.

A variation of the aspect above further comprises a controller configured to generate an output signal based on an electric signal received from the at least one sensor.

A variation of the aspect above is, wherein the output signal is a control signal for changing a setting of the vehicle.

A variation of the aspect above is, wherein the control signal is configured to change a setting for a left or right turn signal of the vehicle.

A variation of the aspect above is, wherein the control signal is configured to change a setting for high or low beam headlights of the vehicle.

A variation of the aspect above is, wherein the control signal is configured to change a setting for windshield wipers of the vehicle.

A variation of the aspect above is, wherein the control signal is configured to change a setting of a driver-assist mode or an autonomous-driving mode of the vehicle.

An aspect is directed to a method for calibrating a switchpack for a vehicle. The method comprises emitting a haptic profile at a first frequency during a first mode of operation, sensing the haptic profile of the first frequency by at least one sensor during the first mode of operation, the at least one sensor being further adapted to generate electric signals in response to force applied on the at least one sensor by a user of the vehicle during a second mode of operation, and identifying a resonance frequency for the switchpack based at least in part on the sensed haptic profile.

A variation of the aspect above further comprises providing haptic feedback during the second mode of operation based at least in part on the resonance frequency.

A variation of the aspect above further comprises generating an output signal based on an electric signal received from the at least one sensor.

A variation of the aspect above is, wherein the output signal is a control signal for changing a setting of the vehicle.

A variation of the aspect above is, wherein the control signal is configured to change a setting for a left or right turn signal of the vehicle.

A variation of the aspect above is, wherein the control signal is configured to change a setting for high or low beam headlights of the vehicle.

A variation of the aspect above is, wherein the control signal is configured to change a setting for windshield wipers of the vehicle.

A variation of the aspect above is, wherein the control signal is configured to change a setting of a driver-assist mode or an autonomous-driving mode of the vehicle.

A variation of the aspect above further comprises emitting a haptic profile at a second frequency during the first mode of operation, the second frequency being different than the first frequency. Wherein identifying the resonance frequency for the switchpack further comprises sensing the haptic profile of the second frequency by the at least one sensor during the first mode of operation and comparing the haptic profiles of the first and second frequency.

A variation of the aspect above is, wherein comparing haptic profiles comprises performing one or more fast Fourier transforms (FFT) on sensed samples.

A variation of the aspect above is, wherein comparing haptic profiles comprises determining one or more scalars of frequency.

An aspect is directed to a method of calibrating a steering wheel of a vehicle. The method comprises emitting a haptic profile at a frequency from a first location on the steering wheel, sensing the emitted haptic profile at a second location on the steering wheel, the second location be spaced a distance X from the first location, and identifying a resonance frequency for the steering wheel based at least in part on the sensed haptic profile.

A variation of the aspect above further comprises emitting a haptic profile at a second frequency from the first location on the steering wheel. Wherein identifying the resonance frequency for the steering wheel further comprises sensing the emitted haptic profile at the second frequency at the second location on the steering wheel and comparing the haptic profiles of the first and second frequency.

A variation of the aspect above is, wherein the distance X is about 3 inches or less.

A variation of the aspect above is, wherein the first location coincides with a location of a haptic motor.

A variation of the aspect above is, wherein the second location coincides with a location of a sensor, the sensor being configured to generate electric signals in response to a force being applied on the sensor by a user.

A variation of the aspect above further comprises providing haptic feedback in response to force being applied on at least one sensor by a user of the vehicle, the haptic feedback being based at least in part on the resonance frequency.

An aspect is directed to a user interface for a vehicle. The user interface comprises at least one sensor adapted to sense force applied on the at least one sensor during a first mode of operation and a haptic motor configured to provide haptic feedback in response to the force applied on the at least sensor during the first mode of operation and provide haptic feedback to the at least one sensor in a second mode of operation. The at least one sensor is further configured to sense the haptic feedback provided by the haptic motor during the second mode of operation.

A variation of the aspect above is, wherein the first mode of operation is during use of the user interface.

A variation of the aspect above is, wherein the second mode of operation is during a calibration process for the haptic motor.

A variation of the aspect above is, wherein the user interface is a steering wheel.

A variation of the aspect above is, wherein the user interface is a switchpack.

BRIEF DESCRIPTION OF THE DRAWINGS

The present inventions are described with reference to the accompanying drawings, in which like reference characters reference like elements, and wherein.

DETAILED DESCRIPTION

Figure 1:
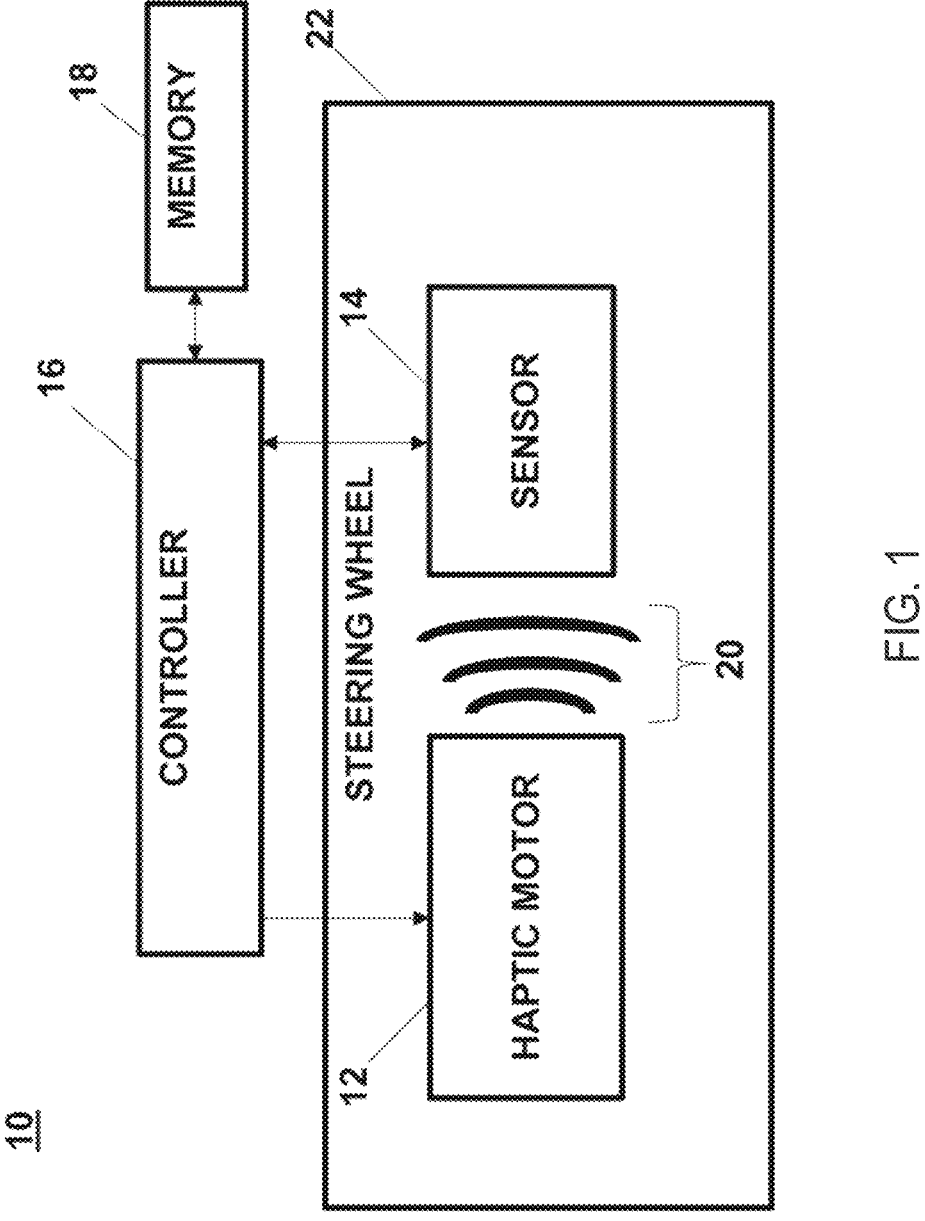
FIG. 1 is a block diagram of a system including a controller and a steering wheel assembly for a vehicle that provides haptic calibration.

Generally described, one or more aspects of the present disclosure relates to a calibration system for a steering wheel assembly. The steering wheel assembly can include one or more haptic motors designed to provide tactile feedback to a user when the user interacts with one or more pressure sensitive components on the steering wheel assembly. The quality of the playback provided by the haptic motor can vary significantly between steering wheel assemblies. The calibration system can optimize operating parameters for each haptic motor. In certain embodiments, the calibration system determines a resonance frequency for the switchpack and haptic motor. In certain embodiments, the calibration system determines a resonance frequency for each haptic motor of the steering wheel assembly. In certain embodiments, the steering wheel assembly comprises two haptic motors with each haptic motor being associated with a subset of the one or more pressure sensitive components on the steering wheel assembly. The resonance frequencies can be used to improve the quality of the playback provided by each haptic motor.

In certain embodiments, the calibration system identifies operating parameters that improve the strength and/or quality of the haptic feedback. For example, in certain embodiments, each haptic motor is configured to play waveforms at a frequency that matches or relate to a resonance frequency. In certain embodiments, the resonance frequency is for one or more components of the steering wheel assembly. In certain embodiments, the resonance frequency is for the entire steering wheel assembly. In certain embodiments, the resonance frequency is for a portion (e.g., left or right portion) of the steering wheel assembly.

The resonance frequency associated with playback by a haptic motor can vary significantly between steering wheel assemblies manufactured to the same specifications (e.g., size, shape, and composition.). For example, testing of yoke designed steering wheel assemblies showed large variances in resonance frequencies between test units ranging from 120 Hz to 240 Hz for each haptic motor. To address these variances and provide a consistent haptic playback in certain embodiments, the calibration system determines operating parameters for each haptic motor at least in part based on a measured resonance frequency associated with each haptic motor.

In certain embodiment, the calibration system employs existing sensors disposed on the steering wheel assembly to determine each resonance frequency. In this way, the calibration system does not employ external measurement equipment (e.g., attaching and then removing test equipment to the haptic motor). Any use of external measurement equipment to perform some sort of calibration would slow down production and ultimately affect yield of the production. In addition, since the external measurement equipment must be removed before vehicle delivery, any change of the resonance frequency over time due to wear and tear, climate, warping, etc. of the steering wheel assembly would diminish the playback of the haptic motor and the user's experience over time.

In certain embodiments, the calibration system employs one or more sensors (e.g., strain-gauge force sensors) already disposed within the steering wheel assembly. For example, in certain embodiments, the one or more sensors are already being employed to detect a user pressing one or more pressure sensitive components. In certain embodiments, the operational parameters (e.g., gain) of the one or more pressure sensitive components is adjusted to perform the calibration process. For example, in certain embodiments, the calibration system increases the gain of at least one first target sensor of the one or more sensors that is closest to a first haptic motor. The calibration process can be performed on the first haptic motor. In certain embodiments, the calibration system increases the gain of at least one target second sensor of the one or more sensors that is closest to a second haptic motor. The calibration process can be performed on the second haptic motor. The first target sensor can be different than the second target sensor. During the calibration process, the at least one target sensor (e.g., first or second sensor) is able to sense playback of its associated haptic motor The calibration system can employ the methods disclosed herein to perform an algorithm (e.g., fast Fourier transforms (FFT)) on profile sweeps commanded to each haptic motor without employing external measurement equipment. Advantageously, the calibration process can be performed at any point during the manufacturing process, and can be re-commanded at any point during the life of the steering wheel assembly without employing external measurement equipment. For example, the calibration process can be applied during the manufacturing process automatically, so there is no need for manual calibration. The calibration process can also be applied remotely or in service if a user experiences a degradation in quality of their haptic feel. This degradation can occur if the steering wheel assembly malforms over time (e.g., change in shape), changing the resonance frequency. In certain embodiments that include more than one haptic motor, each haptic motor can be calibrated to each other so as to provide consistent haptic feedback across the entire switchpack. The calibration process can also be applied remotely or in service if a user experiences a degradation in quality of their haptic feel.

The calibration process can reduce the burden on the vehicle service organization. For example, if a user complains about weak haptic feedback, the service team can remotely trigger a re-calibration to address the problem. Thus, this disclosure can not only solve a manufacturing challenge but can also reduce the burden on the vehicle service organization.

FIG. 1 is a block diagram of a system 10 that comprises a controller 16 and a steering wheel assembly 22 for a vehicle 24 and that also provides haptic calibration. The system 10 includes one or more haptic motors 12. For example, in certain embodiments, the system 10 includes two haptic motors 12.

Figure 2:
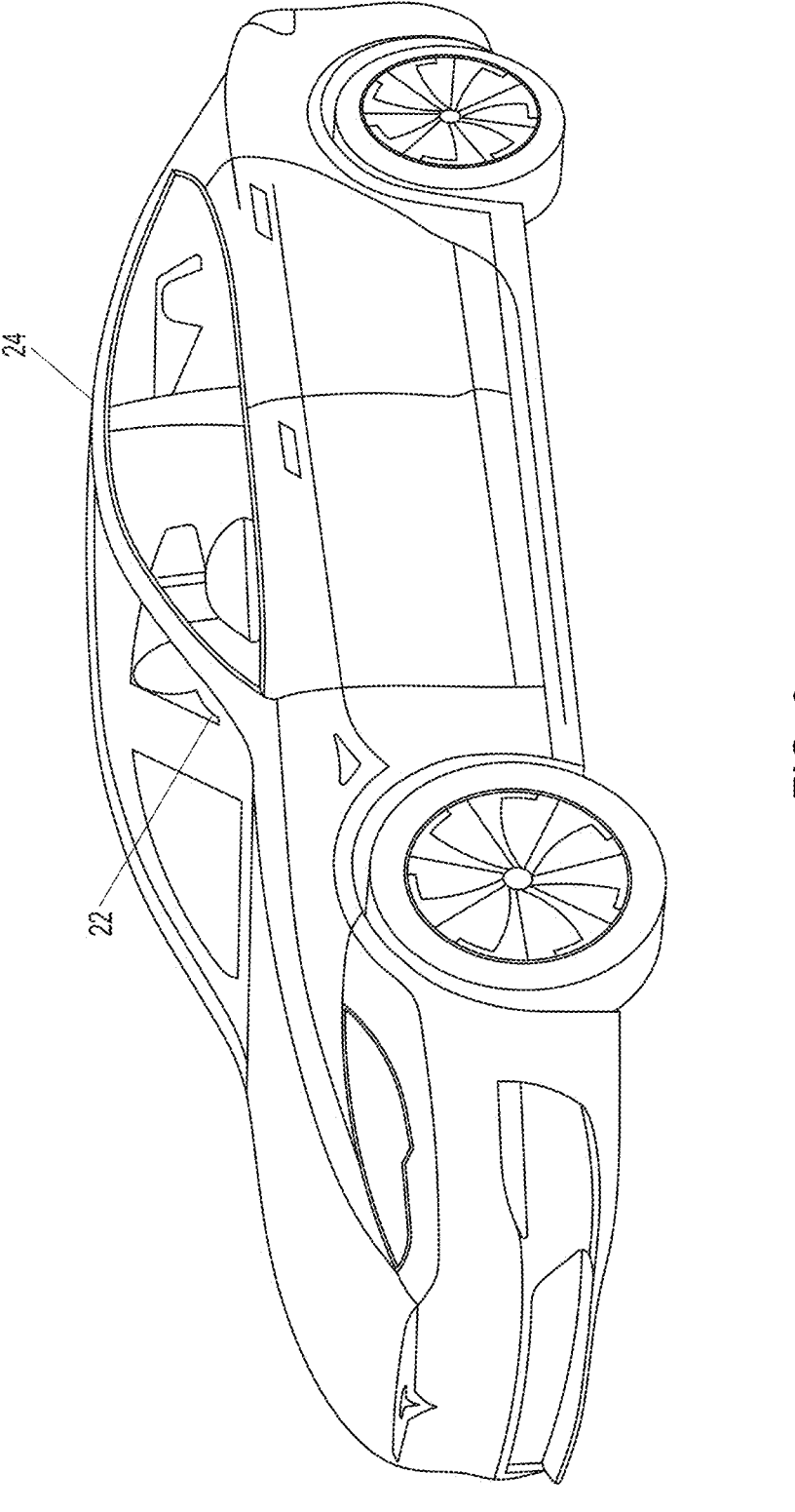
FIG. 2 is an exemplary illustration of a vehicle that includes the system of FIG. 1.
Figure 3:
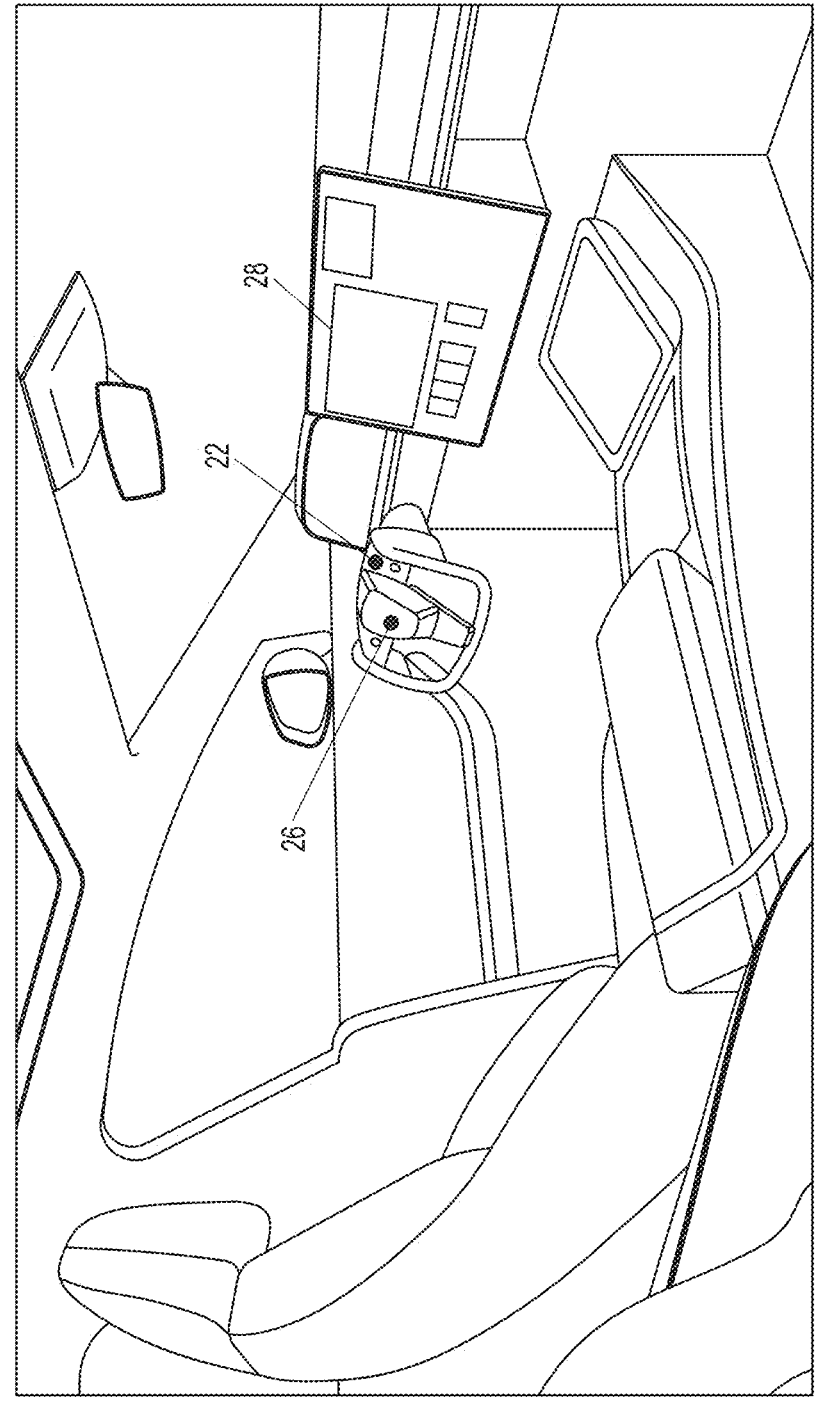
FIG. 3 is a view inside the vehicle of FIG. 2 showing the steering wheel assembly in the form of a yoke.

The system 10 can be incorporated into a variety of vehicles 24, for example, a passenger car, a truck, a sport utility vehicle, or a van. In various embodiments, the vehicle 24 is an electric vehicle, a hybrid vehicle, or a vehicle driven by an internal combustion engine. For example, FIG. 2 is an exemplary illustration of a passenger car that includes the system 10 of FIG. 1. FIG. 3 is a view inside the vehicle 24 of FIG. 2 showing the steering wheel assembly 22 in the form of a yoke.

As shown in FIGS. 1 to 3, the system 10 can include one or more controllers 16 and a steering wheel assembly 22. In certain embodiments, the controller 16 is located in the steering wheel assembly 22. In certain embodiments, the controller 16 is located in the vehicle 24. In certain embodiments that include multiple controllers 16, each controller 16 can be associated with one haptic motor 12.

In certain embodiments, the controller 16 is configured to control the haptic motor 12 during a calibration process (e.g., second mode of operation). In certain embodiments, the controller 16 is configured to control the haptic motor 12, e.g., command operational parameters, during not only the calibration process (e.g., second mode of operation) but also during operation of the vehicle 24 (e.g., first mode of operation) by the user. In certain embodiments, the calibration process is performed in preparation for delivery of the vehicle 24 to the user. In certain embodiments, the calibration process for one or more of the haptic motors 12 is repeated one or more times after delivery of the vehicle 24 to the user.

In certain embodiments during operation of the vehicle 24 (e.g., first mode of operation), the controller 16 receives electric signals from one or more pressure or proximity sensitive components (e.g., sensors 14). In certain embodiments, the controller 16 determines user inputs based on received electric signals. In certain embodiments during operation of the vehicle 24, the controller 16 commands the haptic motor 12 to play waveforms in response to receiving a signal from the one or more pressure or proximity sensitive components (e.g., sensors 14) contacted by the user. In certain embodiments, the waveforms are played at a frequency that is selected based at least in part on a resonance frequency of one or more components or portions of the steering wheel assembly 22. In certain embodiments, the resonance frequency is for a portion of the steering wheel assembly in the region of the haptic motor 12. In certain embodiments, the resonance frequency is for the entire steering wheel assembly 22. In certain embodiments, the signal is in response to the user placing, for example, a finger, in proximity to or in contact with the one or more pressure or proximity sensitive components (e.g., sensors 14).

In certain embodiments during operation of the vehicle 24 (e.g., first mode of operation), the controller 16 generates output signals based on electric signals received from the one or more pressure or proximity sensitive components (e.g., sensors 14). Output signals are embodied as control signals for changing settings of one or more system of the vehicle 24. For example, output signal may result in changing a setting for a left or right turn signal of the vehicle 24, high or low beam headlights of the vehicle 24, windshield wipers of the vehicle 24, voice recognition, an air conditioning unit of the vehicle 24, a lighting system of the vehicle 24, a music system of vehicle 24, and/or changing a setting of a driver-assist mode or an autonomous-driving mode Output signals may be directly sent to a control unit of the vehicle 24 or to individual systems of the vehicle 24. Further, output signals may also be sent to a display unit 28 (FIG. 3). Display unit 28 may be present on the steering wheel assembly 22 or it may be present anywhere in a cab of the vehicle 24 where the user is seated. In certain embodiments, the display unit 28 may include a tablet or smartphone. The display unit 28 may provide notifications to the user regarding change in vehicle system settings or selections made by the user. Output signals may also be transmitted to other remote devices that are connected to the vehicle 24. For example, a tablet or smartphone may be connected to vehicle 24 through short distance communication techniques, for example Bluetooth technology.

In certain embodiments, during operation of the vehicle 24 (e.g., first mode of operation) as well as during the calibration process (e.g., second mode of operation), the controller 16 generates a set of output signals that are transmitted to a haptic motor 12. Such output signals include a command for the haptic motor 12 to provide haptic playback 20. During operation of the vehicle 24 by the user (e.g., first mode of operation), the haptic playback 20 is provided to the user through the steering wheel assembly 22. Specifically, the haptic motor 12 provides haptic feedback to the user indicative of selections made by the user.

In certain embodiments, the controller 16 can be trained such that the controller 16 employs a profile or preferences. The profile or preferences and haptic feedback 20 can be stored in the memory 18 as a user profile. The memory 18 can also store mapping of inputs to functionality and haptic feedback to functionality.

In certain embodiments, during the calibration process (e.g., second mode of operation), the haptic motor 12 provides haptic feedback 20 to be sensed by at least one target sensor 14. For example, in certain embodiments, the controller 16 controls the at least one target sensor 14, e g., command operational parameters. In preparation for sensing the haptic feedback 20, the controller 16 can, in certain embodiments, adjusts one or more operational parameters (e.g., gain) of the target sensor 14 to perform the calibration process. For example, in certain embodiments, the controller 16 commands an increase in the gain of the target sensor 14. For example, the gain can be set to sample at 1 kHz.

In certain embodiments, the target sensor 14 is physically closest to the haptic motor 12 than one or more other sensors 14. In certain embodiments that include multiple haptic motors 12, each target sensor 14 can be physically closest to its associated haptic motor 12. In this way, the target sensor 14 is more likely to sense the playback 20 of the haptic motor 12 as compared to sensors 14 that are farther away from the haptic motor 12. While the haptic playback 20 in FIG. 1 is illustrated as following a path towards the target sensor 14, the playback 20 can be omnidirectional.

In certain embodiments, the controller 16 utilizes the sensed haptic feedback 20 during the second mode of operation to improve the haptic feedback of the haptic motor 12 during the first mode of operation. For example, in certain embodiments, the target sensor 14 provides data or information related to the sensed haptic feedback 20 to the calibration system. In certain embodiments, the calibration system can employ the methods disclosed herein to perform an algorithm (e.g., fast Fourier transforms (FFT)) on profile sweeps commanded to the haptic motor 12 during the second mode of operation. In certain embodiments, the controller 16 calibrates the haptic motor 12. For example, in certain embodiments, the controller 16 determines the resonance frequency of the steering wheel assembly 22 which is then utilized during the first mode of operation.

In certain embodiments, the calibration system compares the haptic feedback 20 to data in one or more look-up tables and/or one or more predetermined parameters to at least in part to calibrate the haptic motor 12. For example, in certain embodiments, the controller 16 can utilize logic control in the form of a look-up table to map information from the sensor 14 to operational parameters (e.g., frequency) of the haptic motor 12. In some embodiments, the look-up table can map individual sensor 14 values to determine operational parameters (e.g., frequency) for the haptic motor 12. In other embodiments, the look-up table can combine individual sensor 14 values measured during the second mode of operation to determine the operational parameters (e.g., frequency) of the haptic motor 12 during the first mode of operation. The sensor 14 values can be specified as absolute values that are mapped in the look-up table, ranges of values, binary indications (e.g., on or off), or non-numeric categories (e.g., high, medium, or low). Still further, the look-up table can incorporate weighting values such that the sensor 14 values can have greater impact or are otherwise ordered in a manner that causes the impact of specific input information to influence the determined operational parameters (e.g., frequency) of the haptic motor 12 for use during the first mode of operation.

In certain embodiments, the look-up tables utilized by the controller 16 can be specifically configured to individual vehicles 24. Alternatively, the look-up tables can be common to a set of vehicles 24, such as by vehicle type, geographic location, user type, and the like. The look-up tables may be statically configured with the controller 16, which can be periodically updated. In other embodiments, the look-up tables can be more dynamic in which the frequency of update can be facilitated via communication functionality associated with the vehicle 24.

In certain embodiments, the look-up table can be configured in a programmatic implementation. Such programmatic implementations can be in the form of mapping logic, a sequence of decision trees, or similar logic. In other embodiments, the controller 16 may incorporate machine learning implementations that may require more refined operation of the haptic motor 12.

In certain embodiments, the controller 16 provides signals corresponding to the determined operational parameters (e.g., frequency) of the haptic motor 12 in the form of an operational profile for use during the first mode of operation. In certain embodiments, the operational profile is customized for the specific haptic motor 12 and switchpack 32.

While the controller 16 is illustrated as a separate component within the system 10, in certain embodiments, the controller 16 is incorporated into another component (e.g., haptic motor 12, sensor 14, vehicle 24, etc.) or vice versa. The controller 16 may embody a single microprocessor or multiple microprocessors. Numerous commercially available microprocessors can be configured to perform the functions of the controller 16. The controller 16 may include all the components required to run an application such as, for example, the memory 18, a secondary storage device, and a processor, such as a central processing unit. Various other known circuits may be associated with the controller 16, including power supply circuitry, signal-conditioning circuitry, communication circuitry, and other appropriate circuitry.

Figure 4:
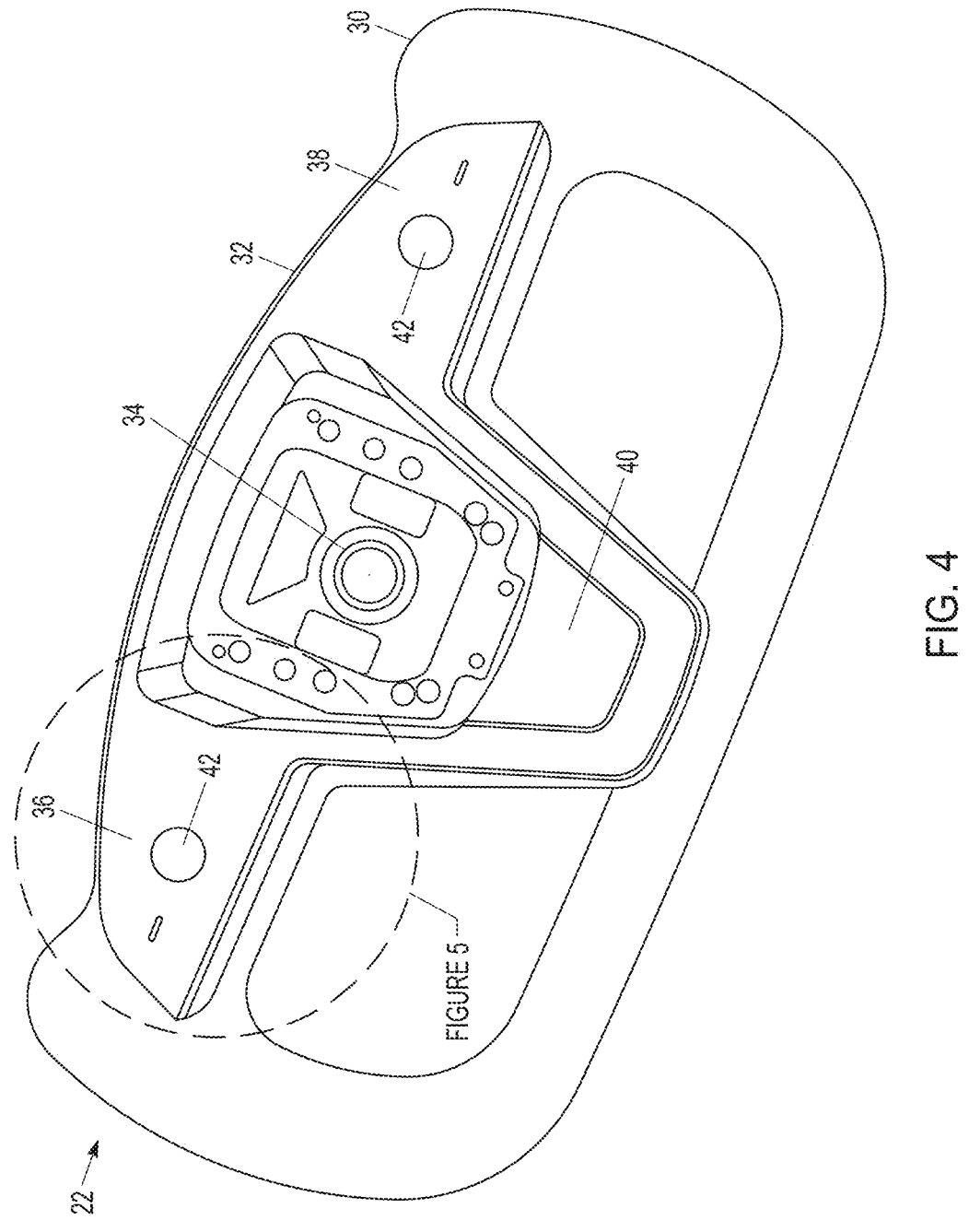
FIG. 4 is a plan view of the steering assembly from FIG. 3 with an airbag module removed from a switchpack of the steering assembly.

FIG. 4 is a plan view of the steering wheel assembly 22. The steering wheel assembly 22 allows a user to maneuver the vehicle 24. The steering wheel assembly 22 includes a steering rim 30. In the illustrated embodiment, the steering rim 30 is generally rectangular in shape. Of course the steering rim 30 can have any other shape including a circular shape.

A switchpack 32 is connected to the steering rim 30. In the illustrated embodiment, the switchpack 32 includes a central portion 34. In the illustrated embodiment, the switchpack 32 includes a first portion 36 extending horizontally from a left side of the central portion 34 and a second portion 38 extending horizontally from a right side of the central portion 34. Additionally, a third portion 40 extends vertically from a lower side of the central portion 34.

In certain embodiments, the central portion 34 of the switchpack 32 is used to house an airbag module 26 (FIG. 3). The airbag module 26 can be disposed within the central portion 34 of the switchpack 32 after which the switchpack 32 is assembled with steering rim 30 to form the steering wheel assembly 22. The airbag module 26 is removed from the switchpack 32 illustrated in FIG. 4 for clarity. In certain embodiments, the switchpack 32 comprises one or more scroll wheels 42 or other mechanical switches for changing or updating vehicle functionalities.

Figure 5:
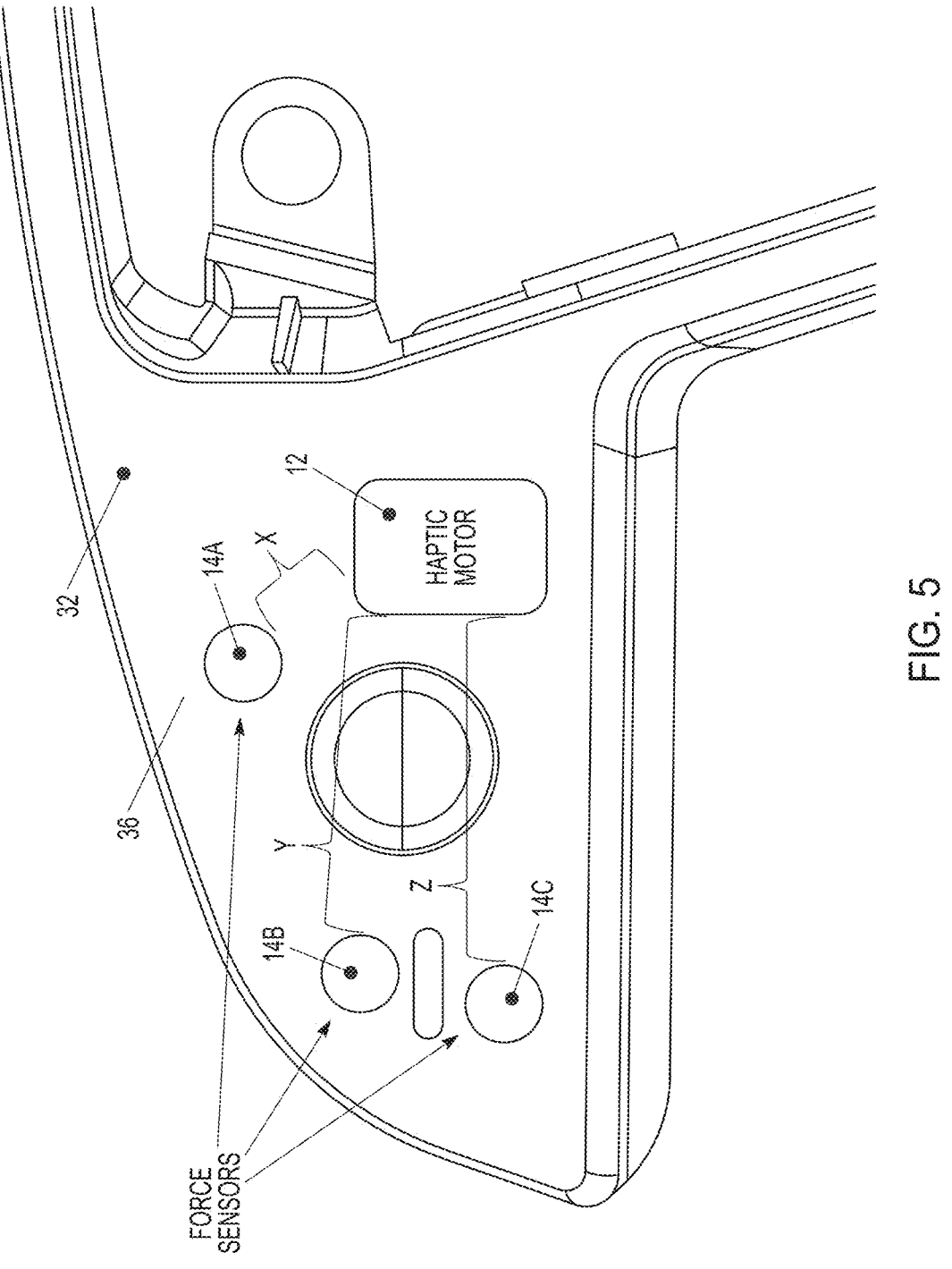
FIG. 5 is a view of a first portion of the left side of the switchpack from FIG. 4 showing outlines of one or more sensors and a haptic motor located within the switchpack.

FIG. 5 is a view of the first portion 36 of the left side of the switchpack 32 from FIG. 4 showing outlines of one or more sensors 14A, 14B, 14C and a haptic motor 12 located within the switchpack 32. The one or more sensors 14A, 14B, 14C are disposed inside the switchpack 32. In the illustrated embodiment, the one or more sensors 14A, 14B, 14C are disposed in the first portion 36 of the steering wheel assembly 32. In certain embodiment, the one or more sensors 14A, 14B, 14C may include a printed circuit board (PCB) that is connected to a connection bus. Additionally, other sensors 14 and haptic motors 12 may be disposed in the second portion 38 and/or third portion 40 of the switchpack 32. For example, in certain embodiments, one or more additional sensors 14 (not shown) and a second haptic motor 12 (not shown) can be located in the second portion 38 of the right side of the switchpack 32. In certain embodiments, the controller 16 is disposed in the third portion 40 of the switchpack 32. In embodiments, the controller 16 may embody a printed circuit board (PCB). The controller 16 may be electrically connected to the PCB of the sensors 14 by the connection bus.

As shown in FIG. 5, the first portion 36 of the switchpack 32 includes a haptic motor 12 for providing haptic feedback 20. In a first mode of operation, the controller 16 determines various user inputs that are provided by the user and output signals as control signals for changing settings of one or more systems of the vehicle 24. For example, output signal may result in changing a setting for a left or right turn signal of the vehicle 24, high or low beam headlights of the vehicle 24, windshield wipers of the vehicle 24, voice recognition, an air conditioning unit of the vehicle 24, a lighting system of the vehicle 24, and/or a music system of vehicle 24, or changing a setting of a driver-assist mode or an autonomous-driving mode.

In certain embodiments, user inputs include gestures that are performed by the user. In certain embodiments, one or more indicators (e.g., surface mount Light Emitting Diodes (LEDs)) and flex circuits are disposed on the switchpack 32 to guide the user to contact locations on the switchpack 32 that correspond to the desired setting of the one or more systems of the vehicle 24. For example, as is illustrated in FIG. 5, the first portion 36 of the switchpack 32 includes at least three predefined areas that correspond with the one or more sensors 14A, 14B, 14C and may be easily accessed by thumbs or fingers of the user without having to disengage contact from the steering wheel assembly 22 while driving. Predefined areas may be present at one or more portions of the steering wheel assembly 22. In certain embodiments, the predefined areas may be present on the second portion 38 of the switchpack 32 or on both first and second portions 36, 38 of the switchpack 32. In yet another embodiment, predefined areas may be present on the third portion 40 of the switchpack 32.

In certain embodiments, by interacting with the predefined portions, the user may be able to select, update, and/or navigate through a menu of controls. Further, based on user inputs and determinations made by the controller 16, the user may receive haptic feedback 20 of the selections made via the haptic motor 12. The user's interaction may occur through gestures made directly on the predefined portions. Gestures may include soft press, hard press, single press, double press, press and hold, or any other gesture or combination of gestures In another example, multiple or complex gestures may be determined by the controller 16.

In certain embodiments, the one or more sensors 14A, 14B, 14C actuate only when a certain amount of force is applied on them. The one or more sensors 14A, 14B, 14C can be arranged to allow determination of user inputs anywhere on the switchpack 32. In certain embodiments, the one or more sensors 14A, 14B, 14C are disposed within the switchpack 32 and vertically below the predefined portions.

In certain embodiments, the one or more sensors 14A, 14B, 14C may include a combination of a capacitive or inductive sensor and a force sensor or a pressure sensor. A resistive sensor may also be used to determine user inputs such as long pressing. In still other embodiments, the one or more sensors 14A, 14B, 14C may include any one of at least one piezoelectric switch, a piezoelectric sensor, and/or a capacitive array.

A piezoelectric switch can be embodied as a commercially available electrical switch that operates on piezoelectric effect. For example, the piezoelectric switch may include a piezoelectric element and an integrated semiconductor device. In certain embodiments, the one or more sensors 14A, 14B, 14C may include multiple piezoelectric switches arranged within the switchpack 32. In certain embodiments, a piezoelectric sensor can be disposed within the switchpack 32. A piezoelectric sensor can be disc shaped. In other embodiments, the piezoelectric sensor may include any other shape. The piezoelectric sensor can be embodied as a commercially available piezoelectric sensor which includes a piezoelectric material configured to generate an electric signal in response to applied pressure.

A capacitive array may be printed on film during manufacturing of the switchpack 32. A capacitive array may include a number of capacitive sensors that are arranged to allow determination of user input. Such capacitive sensors may include any one of an active capacitive sensor or a passive capacitive sensor. A capacitive array senses proximity of the user's finger. In certain embodiments, the capacitive array senses user inputs through gestures made directly on the predefined portions and/or through proximate interaction of user's touch on the predefined portions. For example, the capacitive array may sense that user's finger is approaching the capacitive array. Further, the capacitive array may sense various types of user inputs or gestures, for example, swiping right, sliding up and down, swiping down, clicking, long pressing etc. in certain embodiments In certain embodiments, the one or more sensors 14A, 14B, 14C provides haptic feedback 20 to the user through the user's finger that is interacting with predefined portions. For example, if the user uses his thumb to interact with the predefined portion over the sensor 14A, then haptic feedback 20 is provided by the haptic motor 12 to the thumb of user. The intensity and duration of the haptic feedback 20 provided may vary based on the nature or type of the feedback that the sensor 14 is designed to provide for the given functionality. For example, haptic feedback 20 may include shorter or longer bursts of haptic feedback pulses, closer or more spaced apart bursts of haptic feedback pulses, or varying intensity haptic feedback pulses.

In certain embodiments, the haptic feedback 20 provided by the haptic motor 12 may provide information regarding current settings of system associated with the respective functionality to the user. Exemplary haptic feedbacks 20 may include slide vibration, release, click, hold vibration, touch vibrations, gradual slide vibrations, and/or release and single vibration. The functionality and mapping of user inputs to control the corresponding functionalities of the vehicle 24 is provided herein on an exemplary basis.

In certain embodiments, the calibration system employs one or more of the sensors 14 (e.g., strain-gauge force sensors) already disposed within the steering wheel assembly 22 during the second mode of operation. For example, in certain embodiments, the one or more sensors 14 are already being employed to detect a user pressing one or more pressure sensitive components in the predefined portions.

During the calibration process (e.g., second mode of operation), the haptic motor 12 provides haptic feedback 20 for sensing by the at least one target sensor 14. For example, in certain embodiments, the controller 16 controls the target sensor 14, e.g., command operational parameters. In preparation for sensing the haptic feedback 20, the controller 16 can, in certain embodiments, adjusts one or more operational parameters (e.g., gain) of the target sensor 14 to perform the calibration process. For example, in certain embodiments, the controller 16 commands an increase in the gain of the target sensor 14. In certain embodiments, the target sensor 14A is physically closest to the haptic motor 12 than one or more other sensors 14.

In the illustrated embodiment, the sensor 14A is a distance X away from the haptic motor 12, the sensor 14B is a distance Y away from the haptic motor 12, and sensor 14C is a distance Z away from the haptic motor 12. Distance Z is greater than distance Y which is greater than distance X. In the exemplary calibration process disclosed herein, the sensor 14A is selected as the target sensor 14 because sensor 14A is the closest sensor 14 to the haptic motor 12. In this way, the target sensor 14A is more likely to sense the playback 20 of the haptic motor 12 as compared to the sensors 14B, 14C which are farther away from the haptic motor 12. Of course the calibration process is not limited to only employing the closest sensor 14. In certain embodiments, the target sensor is not the closest sensor and can instead be any sensor 14 that can sufficiently sense the haptic feedback 20 emanating from the haptic motor 12. For example, in certain embodiments, sensor 14B is the target sensor even though it is not the closest sensor but is sufficiently close to the haptic motor 12 to sense the haptic feedback 20 emanating from the haptic motor 12.

During the calibration process, the target sensor 14A senses haptic playback 20 emitted by the haptic motor 12 disposed in the steering wheel assembly 22. The target sensor 14A provides data or information related to the sensed haptic playback 20 to the calibration system. In certain embodiments, the controller 16 calibrates the haptic motor 12. For example, in certain embodiments, the controller 16 determines the resonance frequency of the steering wheel assembly 22 which is then utilized during the first mode of operation.

In certain embodiments, the calibration system can employ the methods disclosed herein to perform an algorithm (e.g., fast Fourier transforms (FFT)) on profile sweeps commanded to the haptic motor 12 without employing external measurement equipment. In certain embodiments, the calibration system compares the haptic feedback 20 to data in one or more look-up tables and/or one or more predetermined parameters to at least in part to calibrate the haptic motor 12.

Advantageously, the calibration process can be performed at any point during the manufacturing process, and can be re-commanded at any point during the life of the steering wheel assembly 22 without employing external measurement equipment. For example, the calibration process can be applied during the manufacturing process automatically, so there is no need for manual calibration. For example, the calibration process can be applied during an initial fitting to the customer or at a distribution center. The calibration process can also be applied remotely or in service if a user experiences a degradation in quality of their haptic feel. This degradation can occur if the steering wheel assembly 22 malforms over time (e.g., change in shape), changing the resonance frequency.

In certain embodiments, software data associated with the calibration process may be updated from time to time. In certain embodiments, an over-the-air (OTA) update is used to add, subtract, alter, or initiate the calibration process. For example, after the vehicle 24 is delivered to the user, an OTA update may initiate the calibration process. Depending on the results of the calibration process, the controller 16 may alter one or more characteristics (e.g., resonance frequency) of the haptic feedback 20. OTA updates open possibilities to adjust haptic feedback 20 and gesture inputs, including based on real-time user data after the vehicle 24 is delivered or based on driver feedback.

In certain embodiments, the system 10 can output an indication of a level of its calibration. For example, in certain embodiments, the haptic motor 12 can be calibrated to a specific level of haptic feedback 20 (e.g., light haptic or sport haptic) with an indication of the level of haptic being available to be output by the system 10. If a user identifies a problem/issue with the level of haptic feedback 20 they experience, the system 10 can implement a confirmation process to determine the current level is the desired level of the user.

Figure 6:
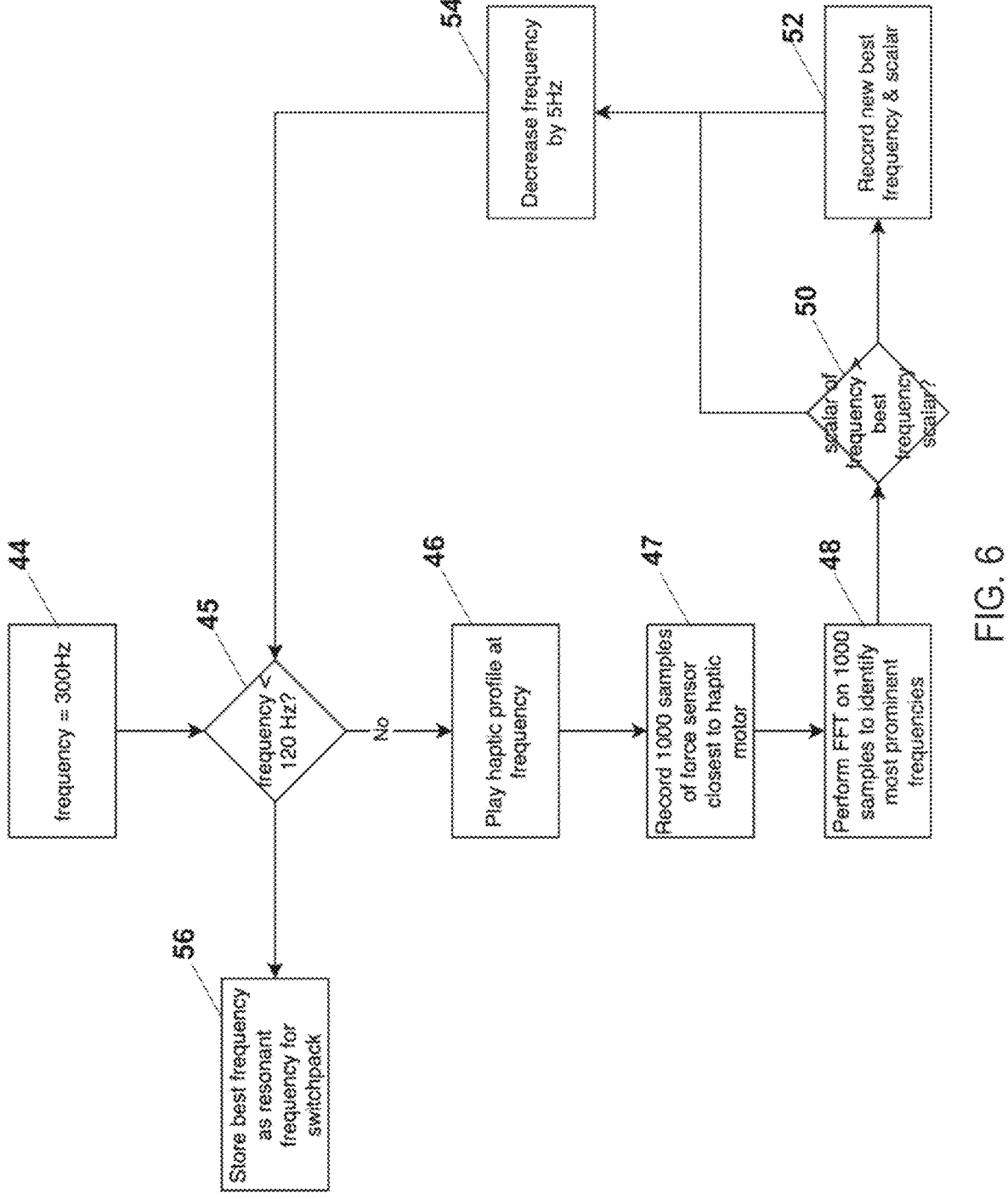
FIG. 6 is a flow chart of an exemplary process performed by the controller from FIG. 1 to calibrate the haptic motor.

FIG. 6 is a flow chart of an exemplary process performed by the controller 16 from FIG. 1 to calibrate a haptic motor 12. The process may be implemented for each haptic motor 12. In certain embodiments, the controller 16 determines test parameters for the calibration process and generates control signals corresponding to the test parameters. The process may be implemented for a set of haptic motors 12 located on the vehicle 24.

Beginning at block 44, the controller 16 selects a starting or current frequency for the calibration process. In the exemplary embodiment, the controller 16 selects 300 Hz. Of course any other frequency is within the scope of this disclosure. At decision block 45, the controller 16 determines whether the starting or current frequency is below a lower threshold. The exemplary lower threshold is 120 Hz. Of course any other frequency is within the scope of this disclosure. If the current or starting frequency is not below the lower threshold, the process moves to block 46 where the controller 16 commands the haptic motor 12 to play a haptic profile at the starting or current frequency.

Next, at block 47, the at least one target sensor 14 senses and records the haptic profile emitted by the haptic motor 12 at the starting or current frequency. Profile sweeps are commanded to the haptic motor 12. In certain embodiments, the controller 16 commands an increase in the gain of the target sensor 14 to increase the sensitivity of the at least one target sensor 14. In certain embodiments, the target sensor 14 is physically closest to the haptic motor 12 than one or more other sensors 14. In certain embodiments, the at least one target sensor 14 records 1,000 samples. In certain embodiments, the at least one target sensor 14 records 512 samples. Of course, any number of samples are within the scope of this disclosure.

Moving to block 48, the controller 16 can perform an algorithm (e.g., fast Fourier transforms (FFT)) on the sensed profile sweeps commanded to the haptic motor 12 without employing external measurement equipment. In certain embodiments, the algorithm is a FFT. In this embodiment, the controller 16 performs an FFT on the samples sensed by the at least one sensor 14 to identify one or more of the most prominent frequencies measured by the at least one sensor 14.

Next, at decision block 50, the controller 16 determines a scalar of frequency for each of the one or more most prominent frequencies and whether the resulting scalar is the best scalar or an improved scalar over the last best scalar. If the scalar is the best scalar or an improved scalar, the process moves to block 52 where the controller 16 records the scalar and the frequency associated with the scalar.

The process then moves to block 54, wherein the controller 16 decreases or changes the frequency. In the exemplary embodiment, the controller decreases the frequency by 5 Hz. Of course any other value of change in frequency is within the scope of this disclosure.

Next at decision block 45, the controller 16 determines whether the current frequency is below the lower threshold. If the current frequency is not below the lower threshold, the process moves to blocks 46 through 54 as described above. If the current frequency is below the lower threshold, the process moves to block 56 where the best frequency recorded at block 52 is identified as a resonance frequency for the tested haptic motor 12.

Returning to decision block 50, if the scalar is not the best or improved scalar, the process moves directly to block 54 without the controller 16 recording the scalar determined at decision block 50 and the frequency associated with the scalar. In certain embodiments, the controller 16 provides the determined operational parameters of the haptic motor 12 in the form of an operational profile.

The controller 16 can transmit information or control signals that cause the haptic motor 12 to operate at the resonance frequency. By customizing the operational frequency of the haptic motor 12, the user experience can be enhanced.

The process can then repeat for a second haptic motor 12.

Process returns to block 44 in embodiments for continuous updating of the resonance frequency for each haptic motor 12. Alternatively, the process can wait for institution of the calibration process.

Figure 7:
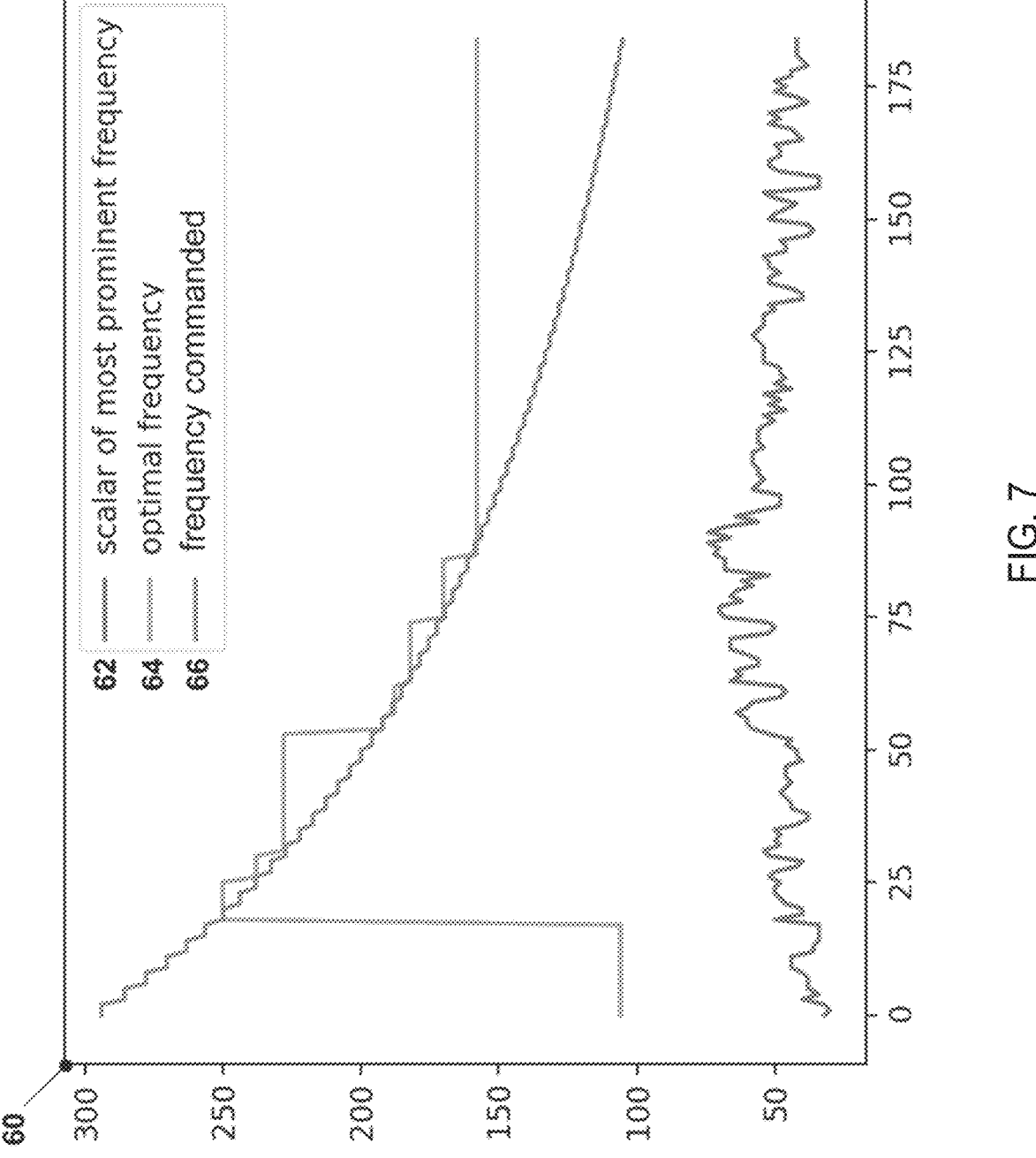
FIG. 7 is a chart of the calibration process performed by the method of FIG. 6.

FIG. 7 is a chart 60 of the calibration process performed by the method of FIG. 6. A scalar of exemplary most prominent frequency 62, an optimal frequency 64, and a commended frequency 66 are each graphed in the chart 60.

Figure 8:
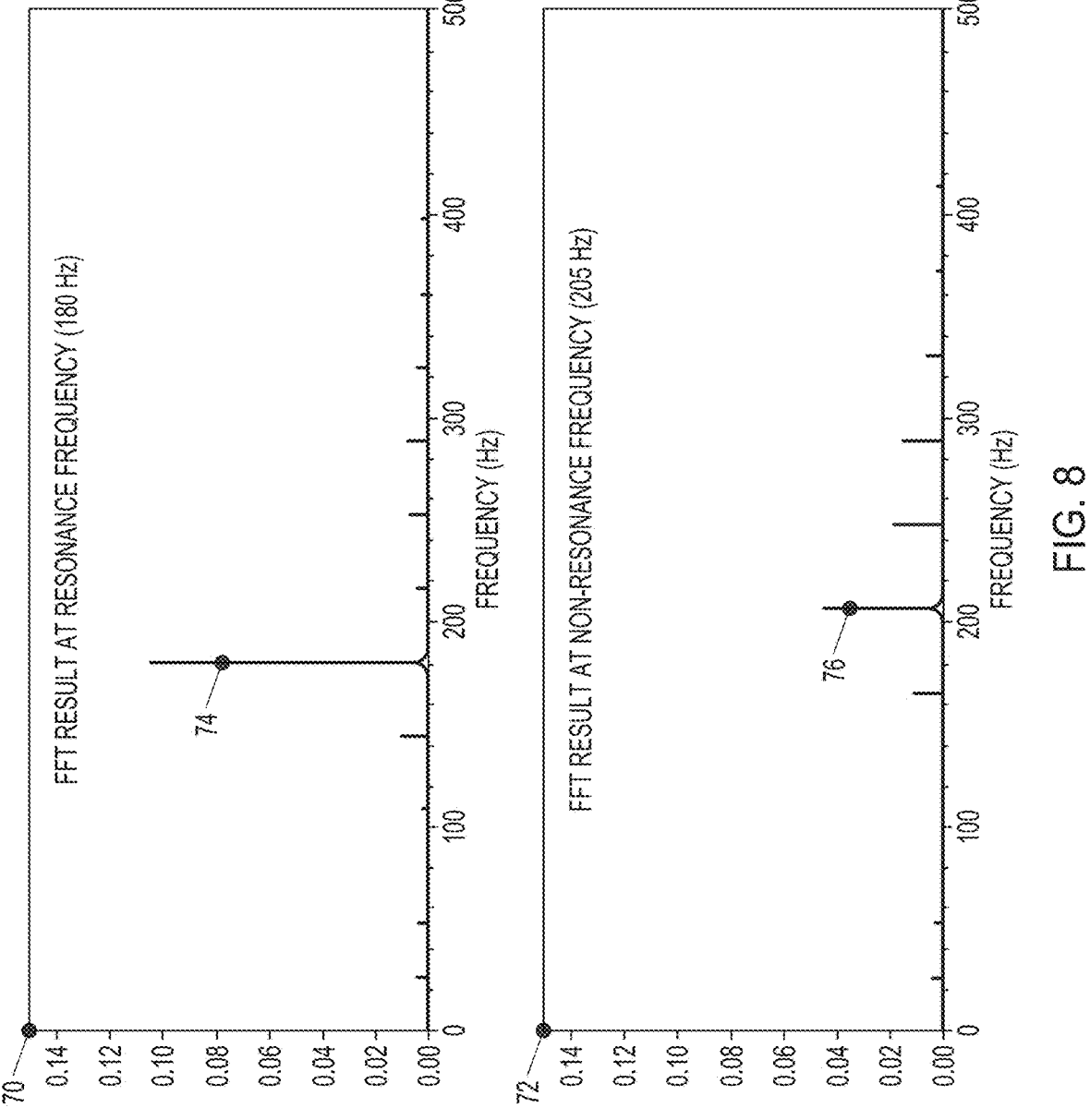
FIG. 8 are two exemplary charts of fast Fourier transforms (FFT) performed on the samples from two different exemplary frequencies (180 Hz, 205 Hz) showing a magnitude of the haptic feedback is increased at the resonance frequency of 180 Hz as compared to at a non-resonance frequency of 205 Hz for the steering wheel assembly.

FIG. 8 are two exemplary charts 70, 72 of fast Fourier transforms (FFT) performed on the samples from two different exemplary frequencies (180 Hz, 205 Hz) showing a magnitude of the haptic feedback is increased at the resonance frequency of 180 Hz 74 as compared to at a non-resonance frequency of 205 Hz 76 for the steering wheel assembly 22.

Figure 9:
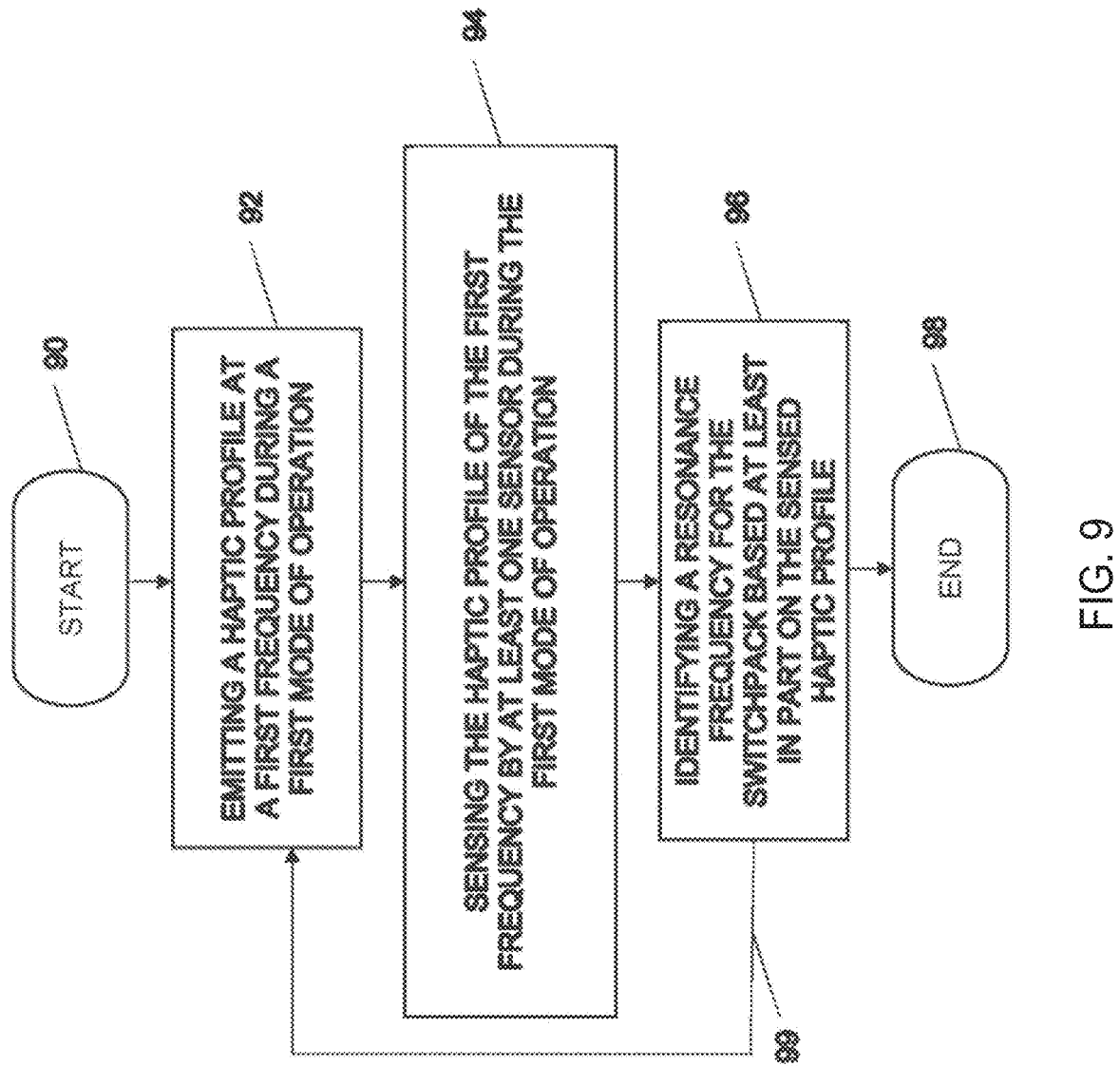
FIG. 9 is a flow chart of an exemplary process performed by the controller from FIG. 1 to identifying a resonance frequency.

FIG. 9 is a flow chart of an exemplary process performed by the controller 16 from FIG. 1 to identify a resonance frequency for the switchpack 32. The process begins at block 90 and then moves to block 92. At block 92, the controller 16 commands the haptic motor 12 to emit a haptic profile at a first frequency during a first mode of operation.

Next, at block 94, the at least one sensor 14 senses the haptic profile of the first frequency during the first mode of operation. In certain embodiments, the at least one sensor 14 can be further adapted to generate electric signals in response to force applied on the at least one sensor 14 by a user of the vehicle during a second mode of operation.

Moving to block 96, the controller 16 can identify a resonance frequency for the switchpack 32 based at least in part on the sensed haptic profile. In certain embodiments, the controller 16 performs an algorithm (e.g., fast Fourier transforms (FFT)) on the sensed profile sweeps commanded to the haptic motor 12 without employing external measurement equipment. In certain embodiments, the algorithm is a FFT In this embodiment, the controller 16 performs an FFT on the samples sensed by the at least one sensor 14 to identify one or more of the most prominent frequencies measured by the at least one sensor 14. In certain embodiments, the at least one sensor 14 provides haptic feedback during the second mode of operation based at least in part on the identified frequency.

The process can move to block 98 and end or return 99 and repeat blocks 92, 94, and 96 for a second frequency. If the process repeats, the controller 16, in certain embodiments, can compare the haptic profiles of the first and second frequency to identify the most prominent frequency.

In certain embodiments, the controller 16 determines a scalar of frequency for each of the one or more most prominent frequencies and whether the resulting scalar is the best scalar or an improved scalar over the last best scalar. If the scalar is the best scalar or an improved scalar, the controller 16 records the scalar and the frequency associated with the scalar. If the scalar is not the best scalar or an improved scalar, the process can return 99 and repeat blocks 92, 94, and 96 for additional frequencies.

In certain embodiments during operation of the vehicle 24, the controller 16 commands the haptic motor 12 to play waveforms in response to receiving a signal from the at least one sensor 14 contacted by the user. In certain embodiments, the waveforms are played at a frequency that is selected based at least in part on the resonance frequency of one or more components or portions of the steering wheel assembly 22. In certain embodiments, the resonance frequency is for a portion of the steering wheel assembly in the region of the haptic motor 12. In certain embodiments, the resonance frequency is for the entire steering wheel assembly 22. In certain embodiments, the signal is in response to the user placing, for example, a finger, in proximity to or in contact with the at least one sensor 14.

Figure 10:
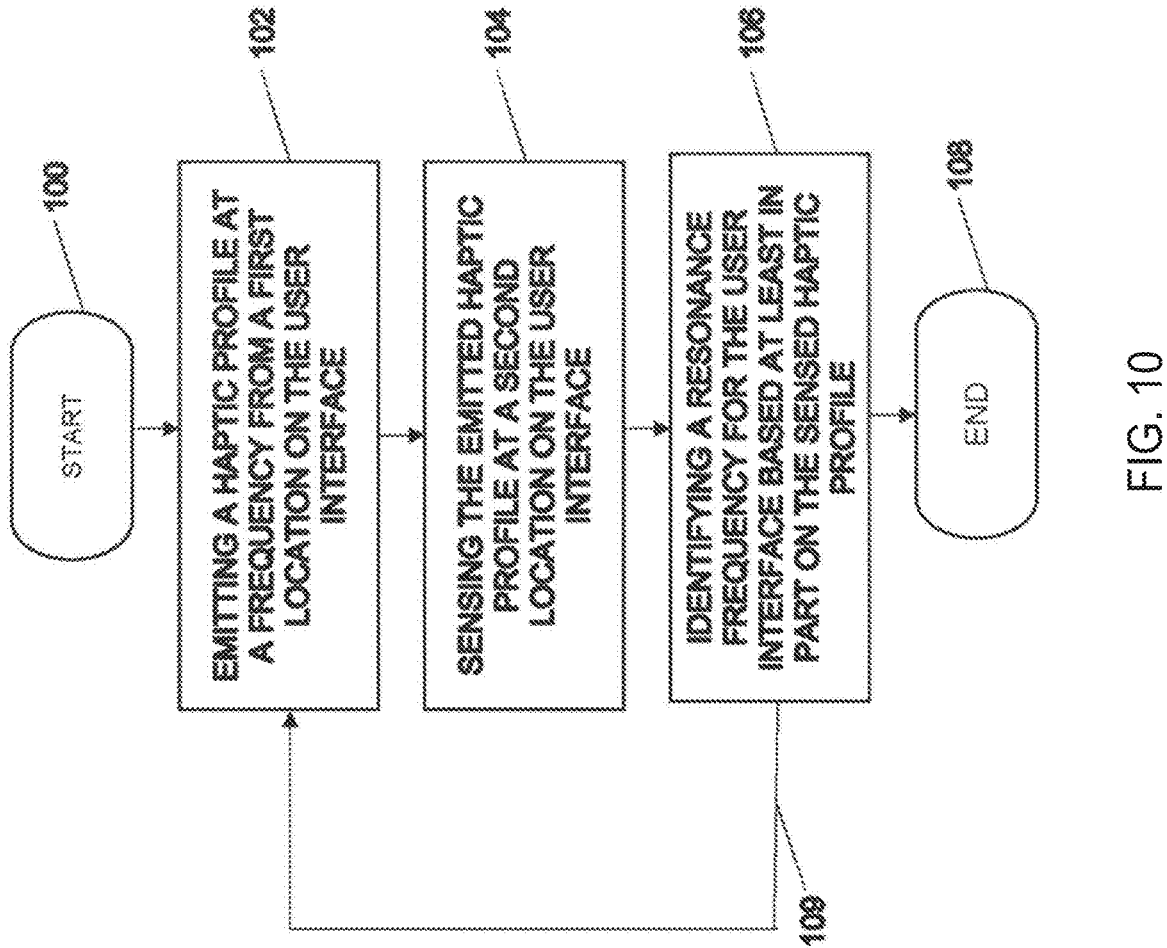
FIG. 10 is a flow chart of an exemplary process performed by the controller from FIG. 1 to identifying a resonance frequency of a user interface (e.g., steering wheel).

FIG. 10 is a flow chart of an exemplary process performed by the controller 16 from FIG. 1 to identifying a resonance frequency of a user interface (e.g., steering wheel 22). The process begins at block 100 and then moves to block 102. At block 102, the controller 16 commands the haptic motor 12 to emit a haptic profile at a frequency from a first location on the steering wheel 22

Next, at block 104, the at least one sensor 14 senses the haptic profile of the first frequency at a second location on the steering wheel 22. In certain embodiments, the second location is spaced a distance X from the first location.

Moving to block 106, the controller 16 can identify a resonance frequency for the steering wheel 22 based at least in part on the sensed haptic profile. In certain embodiments, the controller 16 performs an algorithm (e.g., fast Fourier transforms (FFT)) on the sensed profile sweeps commanded to the haptic motor 12 without employing external measurement equipment. In certain embodiments, the algorithm is a FFT. In this embodiment, the controller 16 performs an FFT on the samples sensed by the at least one sensor 14 to identify one or more of the most prominent frequencies measured by the at least one sensor 14.

The process can move to block 108 and end or return 109 and repeat blocks 102, 104, and 106 for another frequency. If the process repeats, the controller 16, in certain embodiments, can compare the haptic profiles of the frequencies to identify the most prominent frequency.

In certain embodiments, the controller 16 determines a scalar of frequency for each of the one or more most prominent frequencies and whether the resulting scalar is the best scalar or an improved scalar over the last best scalar. If the scalar is the best scalar or an improved scalar, the controller 16 records the scalar and the frequency associated with the scalar. If the scalar is not the best scalar or an improved scalar, the process can return 109 and repeat blocks 102, 104, and 106 for additional frequencies.

In certain embodiments during operation of the vehicle 24, the controller 16 commands the haptic motor 12 to play waveforms in response to receiving a signal from the at least one sensor 14 contacted by the user. In certain embodiments, the waveforms are played at a frequency that is selected based at least in part on the resonance frequency of one or more components or portions of the steering wheel assembly 22. In certain embodiments, the resonance frequency is for a portion of the steering wheel assembly in the region of the haptic motor 12. In certain embodiments, the resonance frequency is for the entire steering wheel assembly 22. In certain embodiments, the signal is in response to the user placing, for example, a finger, in proximity to or in contact with the at least one sensor 14.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure Having thus described embodiments of the present disclosure, a person of ordinary skill in the art will recognize that changes may be made in form and detail without departing from the scope of the present disclosure. Thus, the present disclosure is limited only by the claims.

In the foregoing specification, the disclosure has been described with reference to specific embodiments. However, as one skilled in the art will appreciate, various embodiments disclosed herein can be modified or otherwise implemented in various other ways without departing from the spirit and scope of the disclosure. Accordingly, this description is to be considered as illustrative and is for the purpose of teaching those skilled in the art the manner of making and using various embodiments of the disclosed glove box actuation assembly. It is to be understood that the forms of disclosure herein shown and described are to be taken as representative embodiments. Equivalent elements, materials, processes or steps may be substituted for those representatively illustrated and described herein. Moreover, certain features of the disclosure may be utilized independently of the use of other features, all as would be apparent to one skilled in the art after having the benefit of this description of the disclosure. Expressions such as "including", "comprising", "incorporating", "consisting of", "have", "is" used to describe and claim the present disclosure are intended to be construed in a non-exclusive manner, namely allowing for items, components or elements not explicitly described also to be present. Reference to the singular is also to be construed to relate to the plural.

Further, various embodiments disclosed herein are to be taken in the illustrative and explanatory sense, and should in no way be construed as limiting of the present disclosure. All joinder references (e.g., attached, affixed, coupled, connected, and the like) are only used to aid the reader's understanding of the present disclosure, and may not create limitations, particularly as to the position, orientation, or use of the systems and/or methods disclosed herein. Therefore, joinder references, if any, are to be construed broadly. Moreover, such joinder references do not necessarily infer that two elements are directly connected to each other. Additionally, all numerical terms, such as, but not limited to, "first", "second", "third", "primary", "secondary", "main" or any other ordinary and/or numerical terms, should also be taken only as identifiers, to assist the reader's understanding of the various elements, embodiments, variations and/or modifications of the present disclosure, and may not create any limitations, particularly as to the order, or preference, of any element, embodiment, variation and/or modification relative to, or over, another element, embodiment, variation and/or modification.

It will also be appreciated that one or more of the elements depicted in the drawings/figures can also be implemented in a more separated or integrated manner, or even removed or rendered as inoperable in certain cases, as is useful in accordance with a particular application.

What is claimed:

1. A steering wheel assembly comprising:
a steering rim;
a switchpack connected to the steering rim, the switch-pack comprising:
a haptic motor;
at least one sensor to generate electric signals based on a force applied by a user during a first mode of operation, and to sense haptic feedback provided by the haptic motor during a second mode of operation;
a processor-based controller connected to the at least one sensor and the haptic motor that performs operations that include:
commanding the haptic motor to emit test signals during the second mode of operation starting at a first frequency and decreasing in incremental steps to a lower threshold frequency:
determining a resonance frequency based on the test signals from the second mode of operation; and
adjusting the haptic feedback provided by the haptic motor during the first mode of operation based on the resonance frequency.

2. The steering wheel assembly of claim 1, wherein the switchpack generates an output signal based on the electric signals received from the at least one sensor.

3. The steering wheel assembly of claim 2, where the output signal comprises a control signal for changing a vehicle setting.

4. The steering wheel assembly of claim 1, wherein the at least one sensor includes one or more of:
a piezoelectric sensor;
a capacitive sensor; and
a pressure-sensitive sensor.

5. The steering wheel assembly of claim 1, wherein the first mode of operation includes a normal vehicle operation mode, and wherein the second mode of operation includes a calibration mode.

6. The steering wheel assembly of claim 1, wherein the controller adjusts the haptic feedback provided by the haptic motor during the first mode of operation to match the resonance frequency identified during the second mode of operation.

7. The steering wheel assembly of claim 1, wherein the switchpack further comprises one or more output elements to provide one or more of visual, auditory, and tactile feedback based on user inputs received during the first mode of operation.

8. The steering wheel assembly of claim 1, wherein the haptic feedback provided by the haptic motor is differentiated based on a type of user interaction detected by the at least one sensor.

9. A method for calibrating a switchpack, comprising:
generating, by at least one sensor, an electric signal in response to a force applied to the switchpack during a first mode of operation;
providing haptic feedback to the user via a haptic motor based on the force applied during the first mode of operation;

commanding the haptic motor to emit test signals during a second mode of operation starting at a first frequency and deceasing in incremental steps to a lower threshold frequency:
determining a resonance frequency based on the test signals sensed by the at least one sensor during the second mode of operation; and
adjusting the haptic feedback provided by the haptic motor based on the resonance frequency.

10. The method of claim 9, wherein the switchpack generates an output signal based on the electric signal generated by the at least one sensor.

11. The method of claim 10, wherein the output signal comprises a control signal for changing a vehicle setting.

12. The method of claim 9, wherein the at least one sensor includes one or more of:
a piezoelectric sensor,
a capacitive sensor; and
a pressure-sensitive sensor.

13. The method of claim 9, wherein the first mode of operation includes a normal vehicle operation mode, and wherein the second mode of operation includes a calibration mode.

14. The method of claim 9, wherein the adjusting the haptic feedback based on the resonance frequency includes:
adjusting the haptic feedback provided by the haptic motor to match the resonance frequency.

15. The method of claim 9, wherein the haptic feedback provided by the haptic motor is differentiated based on a type of user interaction detected by the at least one sensor.

16. A method of calibrating a steering wheel of a vehicle, comprising:
generating, by at least one sensor, an electric signal in response to a force applied to the switchpack during a first mode of operation;
providing haptic feedback to the user via a haptic motor based on the force applied during the first mode of operation;
commanding the haptic motor to emit test signals during a second mode of operation starting at a first frequency and deceasing in incremental steps to a lower threshold frequency;
determining a resonance frequency based on the test signals sensed by the at least one sensor during the second mode of operation; and
adjusting the haptic feedback provided by the haptic motor based on the resonance frequency.

17. The method of claim 16, wherein the switchpack generates an output signal based on the electric signal generated by the at least one sensor.

18. The method of claim 17, wherein the output signal comprises a control signal for changing a vehicle setting.

19. The method of claim 16, wherein the at least one sensor includes one or more of:
a piezoelectric sensor;
a capacitive sensor; and
a pressure-sensitive sensor.

20. The method of claim 16, wherein the first mode of operation includes a normal vehicle operation mode, and wherein the second mode of operation includes a calibration mode.

* * * * *